United States Patent [19]

Grimmett

[11] 3,929,585

[45] Dec. 30, 1975

[54] PRODUCTION OF CHARCOAL FROM SAWDUST IN A FLUIDIZED BED

[75] Inventor: Earl S. Grimmett, Idaho Falls, Idaho

[73] Assignee: The United States of America as represented by the United States Energy Research and Development Administration, Washington, D.C.

[22] Filed: Aug. 16, 1972

[21] Appl. No.: 281,255

[52] U.S. Cl. ............... 201/2.5; 201/31; 201/38; 201/10; 201/20
[51] Int. Cl.² ........................................ C10B 57/04
[58] Field of Search ............. 201/31, 36, 37, 28, 20, 201/2.5, 38

[56] References Cited
UNITED STATES PATENTS

| | | | |
|---|---|---|---|
| 2,741,549 | 4/1956 | Russell | 201/31 |
| 3,436,314 | 4/1969 | Lednor | 201/31 |
| 3,523,911 | 8/1970 | Funk | 201/28 |
| 3,541,025 | 11/1970 | Oda | 201/36 |
| 3,562,115 | 2/1971 | Dunlop | 201/31 |

Primary Examiner—Norman Yudhoff
Assistant Examiner—Hiram H. Bernstein
Attorney, Agent, or Firm—John A. Horan; Arthur A. Churm; James W. Weinberger

[57] ABSTRACT

A method for disposing of wood refuse and recovering valuable wood by-products without polluting the ennvironment by mixing the wood refuse with inert granulated bed material to form a fluidizable mixture which is heated in a fluidized bed pyrolyzer until charcoal and other by-products are formed. Upon discharge of the charcoal and bed material from the pyrolyzer, they are separated and the inert material is mixed with additional wood refuse and recirculated through the pyrolyzer while the charcoal is cooled in an oxygen-free atmosphere. The other wood by-products are carried from the pyrolyzer with the off-gas, from which they are separated and recovered for further processing, leaving only the purified off-gas to be vented to the environment. The method is also useful for producing activated charcoal by treating the charcoal and bed material mixture in a second fluidized bed to activate the charcoal before discharge to the separator and charcoal cooler. Also disclosed is a fluidized bed containment vessel having a baffled interstructure to eliminate back mixing of the wood refuse with the charcoal already formed in the bed.

4 Claims, 2 Drawing Figures

U.S. Patent  Dec. 30, 1975  3,929,585
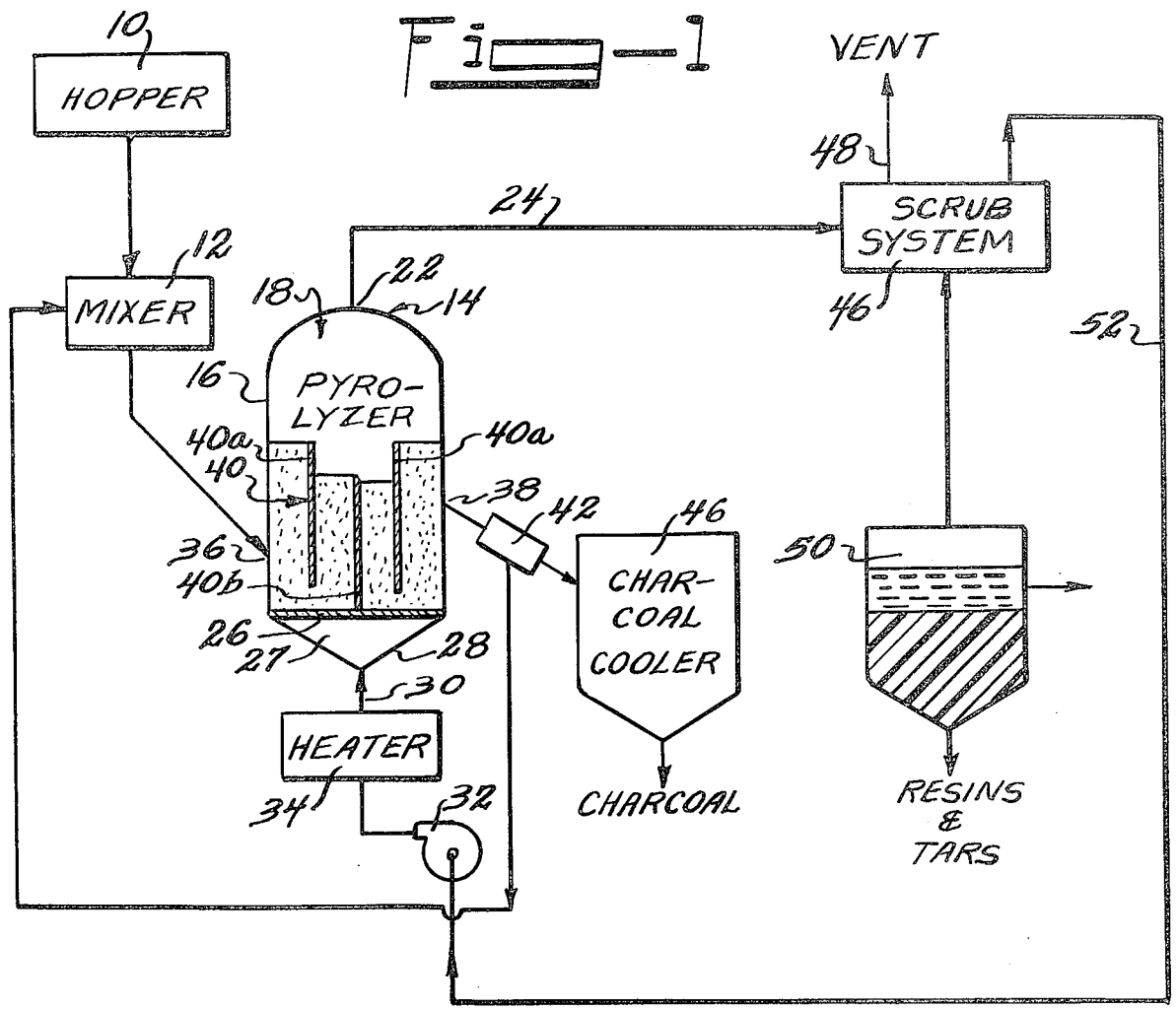
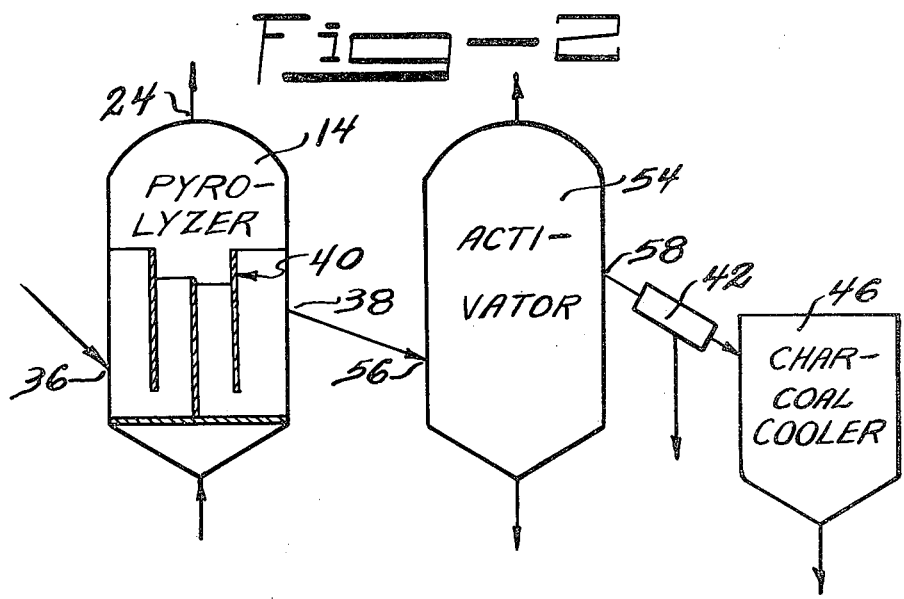

PRODUCTION OF CHARCOAL FROM SAWDUST IN A FLUIDIZED BED

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method and apparatus for disposing of wood refuse in a pollution-free manner. More specifically, this invention relates to a method of disposing of wood refuse and recovering charcoal and other valuable by-products without polluting the environment.

One of the major problems presently facing the world today is environmental pollution, and much effort is currently being directed on the national level to seek solutions to this problem.

One major source of pollution in certain areas of the nation is disposal of wood refuse resulting from the processing of logs into wood products such as lumber. This refuse, consisting of sawdust, wood chips and tree bark, amounts to many millions of tons per year which must be disposed of economically and efficiently. It has been estimated that in one recent year almost three million tons (dry weight) of wood refuse was disposed of in one western state.

At present most of this refuse is disposed of by burning in wigwam or tepee burners. It is difficult to operate these burners without causing serious air pollution problems. In addition, any type of burning results in the loss of many valuable wood byproducts such as charcoal, acetic acid, ethyl alcohol, acetone and many others. Of these by-products, charcoal is perhaps the most important, since charcoal is useful as a fuel and for the purification of water and many chemicals. The use of charcoal in the purification of water alone consumes more than one-quarter of the total output, since charcoal not only removes toxic material but also contaminants which produce unpleasant odors, tastes and colors.

SUMMARY OF THE INVENTION

It has been found that it is possible to fluidize wood refuse by mixing the refuse with an inert granular material. By heating this mixture in a fluidized bed pyrolyzer under pyrolyzing conditions and maintaining the mixture in the bed for a sufficient period of time, it is possible to obtain complete pyrolyzation of the refuse to charcoal and various other wood by-products. By employing proper waste management techniques, all of the valuable by-products produced by the pyrolyzation of the wood refuse can be recovered and the wood refuse can be economically and effectively disposed of while venting only clean, nonpolluting gases to the environment.

Accordingly, the present invention relates to a method for disposing of wood refuse while simultaneously recovering charcoal and wood by-products without polluting the environment by mixing the wood refuse with inert granular bed material to form a feed mixture; passing the feed mixture into a fluidized bed containment vessel; fluidizing the mixture with an oxygen-free gas, thereby forming a fluidized bed; heating the bed to a temperature sufficient to pyrolyze the wood refuse; maintaining the retained wood refuse in the bed until pyrolyzation of the refuse to charcoal and gaseous by-products is complete, the charcoal remaining with the inert bed material and the gaseous by-products being carried from the bed with the fluidizing off-gas; removing the charcoal and bed material from the vessel; separating the charcoal from the bed material, cooling the charcoal in an oxygen-free atmosphere while recirculating the bed material to be mixed with additional wood refuse; separating the gaseous by-products from the fluidized bed off-gas; recovering the by-products while venting the purified off-gas to the environment.

The method of this invention is also useful for producing activated charcoal by passing the charcoal and bed material mixture into a second fluidized bed containment vessel where the mixture is fluidized with an oxygen-free charcoal activating gas such as $CO_2$ or steam and heated to a temperature of 1400° to 1800°F., thereby activating the charcoal before discharging the activated charcoal and bed material mixture from the vessel to the separator.

It is therefore one object of this invention to provide a pollution-free method of disposing of wood refuse.

It is another object of this invention to provide a pollution-free method of disposing of wood refuse while obtaining valuable wood by-products.

It is a further object of this invention to provide a pollution-free method of disposing of wood refuse in a fluidized bed.

It is another object of this invention to provide a method for producing activated charcoal.

It is still another object of this invention to provide an apparatus for the pollution-free disposal of wood refuse.

Finally, it is the object of this invention to provide a fluidized bed containment vessel suitable for the disposal of wood refuse and recovery of valuable wood by-products without polluting the environment.

BRIEF DESCRIPTION OF THE DRAWINGS

FIG. 1 shows an apparatus useful for practicing the method of the invention.

FIG. 2 is a modification of the apparatus for producing activated charcoal.

SPECIFIC EMBODIMENT OF THE INVENTION

Referring now to FIG. 1, the wood refuse to be pyrolyzed is stored in hopper 10 from where it is fed to mixer 12 which may be any device to combine the wood refuse with inert granular bed material to form a feed mixture before being fed into fluidized bed containment vessel or pyrolyzer 14.

The inert bed material may be any inert fluidizable material capable of withstanding temperature up to about 1800°F., for example, sand or alumina. It was found that a mixture of bed material of from about −14 to about 100 mesh is satisfactory for this purpose. To achieve a good fluidized bed the feed mixture should contain from about 40 to about 60% by volume of bed material; however, this ratio will vary depending upon the size of wood refuse and the amount of moisture which the wood may contain.

By the wood refuse is meant sawdust, wood chips, tree bark or any combination thereof. The size of the refuse that can be handled by this method will depend upon the size of the equipment being used. Wood chips as large as 0.75 inch by 1.5 inches and containing up to 50 by weight of water have been found to be readily fluidizable when mixed with about 50% by volume of the bed material.

The fluidized bed pyrolyzer 14 consists of vertical cylindrical vessel 16 which defines an upper disengaging section 18 and a lower fluidizing section 20. Vessel 16 is covered at the upper end by dome-shaped top 22 penetrated by off-gas outlet 24. Extending horizontally across the lower end of vessel 16 is bed support and gas distribution plate 26. Enclosing the lower end of vessel 16 to define plenum 27 is cone-shaped end cap 28 which is penetrated by gas inlet line 30 from blower 32 through gas heater 34. Vessel 16 is penetrated on one side of fluidizing section 20 by feed inlet 36 and on an opposite side by material outlet 38. Within fluidizing section 20 are a plurality of fixedly mounted, evenly spaced vertical baffle plates 40 extending across vessel 16 perpendicular to the flow of material from feed inlet 36 to material outlet 38. Alternating baffle plates 40a extend downward from the top of fluidizing section 20 to a short distance above bed support plate 26 while intermediate baffle plate 40b extends downward from below the top of fluidizing section 20 to bed support plate 26.

In operation, the feed mixture enters pyrolyzer 14 through feed inlet 36 and is fluidized in fluidizing section 20 by an oxygen-free gas such as $CO_2$ or nitrogen. The gas is pressurized by blower 32 and heated to pyrolyzing temperature by heater 34 before entering plenum 27 through gas inlet line 30 and passing upward through gas distribution plate 26 to fluidize the feed material. The heated fluidized feed mixture will flow generally from feed inlet 36 under baffle plates 40a and over baffle plates 40b to material outlet 38. By this manner, back mixing is prevented so that, as the wood refuse is pyrolyzed to charcoal, it is kept separate from the fresh wood refuse entering the bed through inlet 36. The charcoal remains with the bed material and is discharged from the pyrolyzer through material outlet 38 and the other wood by-products which are carried with the fluidizing off-gas through disengaging section 18 from pyrolyzer 14 through off-gas outlet 24.

Pyrolyzing temperatures may range from about 280° to about 1000°F., with the higher temperatures being preferred to decrease pyrolyzation times. Although some heating of the fluidizing gas will be necessary to start pyrolysis, the reaction is exothermic and additional heating may not be necessary. The amount of time necessary to completely pyrolyze the wood refuse will depend upon the temperature of the fluidized bed, the size of the wood refuse being pyrolyzed and the amount of moisture which the wood contains. It was found that for wood refuse smaller than ¼ inch in diameter and containing about 50% moisture 2–3 minutes at 1000°F. was adequate to obtain complete pyrolysis.

The charcoal and bed material mixture after discharge through outlet 38 passes through separator 42 which may be a simple mechanical screening device where the bed material is separated from the charcoal and recirculated back to mixer 12 to be mixed with additional wood refuse and recycled into pyrolyzer 14. The separated charcoal which is hot passes from separator 42 into charcoal cooler 44 for cooling to ambient temperature in an oxygen-free atmosphere to prevent combustion.

The off-gas from the pyrolyzer carrying with it the wood by-products in a gaseous state exits the pyrolyzer through off-gas outlet 24 into scrub system 46 where the fluidizing off-gas is purified by separating the gaseous wood by-products therefrom and the purified off-gas is vented to the atmosphere through vent 48. The scrub system may contain devices well known to those skilled in the art for purifying and condensing the gaseous by-products, for example, a venturi scrubber to remove the heavier distillate material such as, for example, the wood resins and tars, a wet cyclone to remove the high boiling condensate materials such as methyl alcohol and a water-cooled condenser for recovering the remaining condensable material such as the water vapor. All of these condensable wood by-products are sent to holding tank 50 where they are retained for later separation and further processing. The noncondensable gaseous wood by-products such as $CO_2$, CO, hydrogen and methane gas can be recycled by return line 52 to blower 32 to provide fluidizing gas to the pyrolyzer 14.

A second embodiment of the method of the invention is shown in FIG. 2 whereby the charcoal produced as hereinbefore described can be activated. By this method, after pyrolyzation of the wood refuse is complete in pyrolyzer 14, the charcoal and bed material mixture passes from the pyrolyzer through outlet 38 into second fluidized bed activator 54, which may or may not contain internal baffling, through inlet 56 where the mixture is fluidized with a gas such as $CO_2$ or steam at a temperature of about 1400° to 1800°F. for a period of time sufficient to activate the charcoal. When activation of the charcoal is complete, the mixture passes from activator 54 through outlet 58 into separator 42 where the bed material is screened from the activated charcoal and recirculated back to mixer 12, while the hot activated charcoal passes into charcoal cooler 44 for cooling in an oxygen-free atmosphere. The period of time sufficient to activate the charcoal will depend upon the wood from which the charcoal was produced, but should require no more than about one half hour.

EXAMPLE

A feed mixture of wood refuse containing 50% by volume of sand that was above about 35 mesh in size was prepared. The feed mixture was screened and only material passing through the ¼-inch openings was used due to the size of feed lines being used. The feed mixture was introduced into a 4-inch fluidized bed containment vessel through an air lock chamber. The bed was fluidized with carbon dioxide and held as close as possible to a temperature of 1000°F. It was found that feed rates as high as 4.5 liters of the feed mixture per hour could be maintained and that a mixture of charcoal and sand could be removed from the bed 2 to 3 minutes after charging with a batch of feed mixture, indicating a rapid reaction rate.

Although no accurate material balances were obtained, approximate yields of charcoal ranged from 15 to 20 percent. Most of the charcoal could be separated from the bed material by simple screening because the sand would pass through 35 mesh (Tyler) screen, but the charcoal would not. The charcoal as recovered was a granular material which ranged in size from 35 mesh up to 6 mesh. It had an approximate bulk density of 15 pounds per cubic foot and, when crushed to pass a 20 mesh screen, its bulk density increased to approximately 25 pounds per cubic foot.

As can be understood from the foregoing description, the method of this invention is useful, not only for the pollution-free disposition of wood wastes, but also for the production of charcoal and for the collection for further processing of other wood by-products from charcoal production.

It has been estimated that the equipment for disposing of about 150 tons of wood refuse a day could easily produce about 30 tons of charcoal a day in addition to the other by-products which are also produced.

The embodiments of the invention in which an exclusive property or privilege is claimed are defined as follows:

1. A method of disposing of wood refuse while simultaneously recovering charcoal and wood by-products without polluting the environment comprising: mixing the wood refuse selected from the group consisting of sawdust, wood chips and tree bark with about 40–60% by volume of an inert granular bed material which is from about −14 to 100 mesh in size selected from the group consisting of sand and alumina to form a feed mixture; passing the feed mixture into a fluidized bed containment vessel; fluidizing said mixture with an oxygen-free gas, thereby forming a fluidized bed; heating said fluidized bed to 280° to 1000°F to pyrolyze the wood refuse; maintaining the wood refuse in the bed until pyrolyzation of the refuse to charcoal and gaseous wood by-products is complete, the charcoal remaining with the bed material and the gaseous by-products being carried from the bed with the fluidizing off-gas; removing the charcoal and bed material from the vessel; separating the charcoal from the bed material; cooling the charcoal in an oxygen-free atmosphere while recirculating the inert bed material to be mixed with additional wood refuse; separating the gaseous by-products from the fluidized bed off-gas; recovering the by-products and venting the purified off-gas to the atmosphere.

2. The method of claim 1 wherein the fluidizing gas is selected from the group consisting of $CO_2$ and nitrogen.

3. A process for making activated charcoal from wood refuse in a fluidized bed comprising: mixing the wood refuse selected from the group consisting of sawdust, wood chips and tree bark with about 40–60% by volume of an inert granular bed material which is from about −14 to 100 mesh in size selected from the group consisting of sand and alumina to form a feed mixture; passing the feed mixture into a fluidized bed containment vessel; fluidizing the mixture with an oxygen-free gas, thereby forming a fluidized bed; heating the bed to 280° to 1000°F to pyrolyze the wood refuse; maintaining the wood refuse in the bed until pyrolyzation of the refuse to charcoal and gaseous wood by-products is complete, the charcoal remaining with the inert granular material and the gaseous by-products being carried from the bed with the fluidizing off-gas; removing the charcoal and granular mixture from the vessel into a second fluidized bed containment vessel; fluidizing the mixture with a gas selected from the group consisting of steam and $CO_2$, thereby forming a fluidized bed; heating said second bed to a temperature of from 1400° to 1800°F for a period of time sufficient to activate the charcoal; removing the activated charcoal and bed material mixture from the fluidized bed; separating the activated charcoal from the bed material and cooling the charcoal in an oxygen-free atmosphere.

4. The method of claim 3 wherein the oxygen-free fluidizing gas is selected from the group consisting of $CO_2$ and nitrogen.

* * * * *